United States Patent [19]
Haase

[11] Patent Number: 5,707,204
[45] Date of Patent: Jan. 13, 1998

[54] STACKING APPARATUS

[75] Inventor: Christopher Lynn Haase, Elburn, Ill.

[73] Assignee: MiTek Holdings, Inc., Wilmington, Del.

[21] Appl. No.: 544,653

[22] Filed: Oct. 18, 1995

[51] Int. Cl.[6] ................................. B65G 57/11
[52] U.S. Cl. ................ 414/790; 414/789.8; 414/789.9; 414/790.7; 209/521
[58] Field of Search ................ 414/789.8, 789.9, 414/790, 790.7, 790.4, 794.4, 786; 209/517, 518, 519, 520, 521, 933

[56] References Cited

U.S. PATENT DOCUMENTS

| | | | |
|---|---|---|---|
| 2,606,483 | 8/1952 | Forbes, Jr. | 414/790 |
| 2,613,824 | 10/1952 | Tallman | 414/790 |
| 2,698,100 | 12/1954 | Fried | 214/8 |
| 2,838,185 | 6/1958 | Horstkotte | 414/790.7 |
| 2,895,624 | 7/1959 | Oster, Jr. | 414/790 |
| 3,418,895 | 12/1968 | Palmer | 414/790 |
| 3,627,099 | 12/1971 | Shaffer | 198/20 R |
| 4,054,211 | 10/1977 | Moseley | 414/790 |
| 4,219,120 | 8/1980 | Rysti | 209/521 |
| 4,249,844 | 2/1981 | Lampe et al. | 414/790 |
| 4,413,941 | 11/1983 | Kollman | 414/790 |
| 4,613,033 | 9/1986 | Focke et al. | 198/457 |
| 4,615,521 | 10/1986 | Mori | 414/790 |
| 4,623,057 | 11/1986 | Langenberg | 198/381 |
| 4,892,458 | 1/1990 | Proulx | 414/790 |
| 4,978,275 | 12/1990 | Reid et al. | 414/789.5 |
| 5,165,218 | 11/1992 | Callahan, Jr. | 53/447 |
| 5,203,671 | 4/1993 | Cawley et al. | 414/791.6 |
| 5,290,141 | 3/1994 | Grinager | 414/790.4 |

*Primary Examiner*—Karen B. Merritt
*Assistant Examiner*—Douglas Hess
*Attorney, Agent, or Firm*—Senniger, Powers, Leavitt & Roedel

[57] ABSTRACT

Stacking apparatus includes an article feeder which feeds articles, such as cut boards, to support fingers on which a stack of boards is formed. The support fingers transfer a single stack containing a predetermined number of boards down to a stack conveyor which transport the stack to a collection area. Other support fingers may be used to form a second stack at the same time the first stack is being transported by the stack conveyor to the collection area. Stops are used to retain the boards as they are dropped onto the support fingers. The stops are free of connection to the support fingers and the stack conveyor such that the stacks are moved freestanding to the collection area.

17 Claims, 7 Drawing Sheets

STACKING APPARATUS

BACKGROUND OF THE INVENTION

This invention relates generally to stacking apparatus and more particularly to apparatus for stacking articles in a single vertical stack and transporting them to a remote location.

The present invention has particular, though not exclusive application, in the field of stacking boards used for forming wooden trusses of the kind used to build roofs of buildings. There are presently automatic saws which are capable of receiving stock pieces of wood and automatically cutting all of the boards needed for a particular truss. An example of such a saw is the MiTek EASY SET® automatic saw (Model No. 4000) manufactured by the assignee of the present invention. The boards of the truss which are cut by the automatic saw must be collected and transported to a truss assembly table where the boards are assembled and secured together, as by pressing in nailing plates at the joints between adjacent boards.

In order to facilitate the assembly of the boards into the truss, it is highly desirable to keep the boards in order so that the assembler may readily locate the board which goes in each position in the truss. It is more efficient to transport the boards to the assembly table if they are stacked together. There presently exist stackers which are capable of forming stacks of boards. One type of stacker lines up a predetermined number of boards side-by-side and then transports the line of boards to a cart. In the line, the broad flat faces of the boards face upwardly and the thinner sides are in contact with each other. A second line is formed and transported to the cart where the second line is stacked on top of the first line. Additional lines of boards are similarly formed and added to the stack on the cart until a bundle of boards for transport to an assembly table are stacked. The stack can be bundled together and carried away by a forklift or other suitable device, or the cart may be wheeled away to the assembly table and replaced by a new cart.

The existing stacker requires that stacking operations stop when the cart is full and the stack must either be removed or the cart replaced. Sometimes it is desirable to collect only a few boards, perhaps consisting of one or two lines, before transporting them to an assembly table. This necessitates a substantial interruption in the operation of the stacker, because less than a full stack is formed before the stacker must be stopped. It is not possible to place a strap around one or two lines of boards to secure them together because if force is applied by the strap to the lines of boards, the thinner sides of the boards slip out of contact with each other thereby destroying the stack.

SUMMARY OF THE INVENTION

Among the several objects and features of the present invention may be noted the provision of stacking apparatus which is capable of operating substantially continuously without regard to the number of stacked components needed for any given run; the provision of such stacking apparatus which is capable of forming one stack while simultaneously transporting a prior formed stack to a remote location for offloading from the stacking apparatus; the provision of such stacking apparatus which is capable of bundling a single vertical stack of components; the provision of such stacking apparatus which transports stacks of components independently of any vertical supports; the provision of such stacking apparatus which compacts collections of stacks for forming tight, stable bundles; the provision of such stacking apparatus which is automatically adjustable for stacking articles of different sizes; the provision of such apparatus which forms collections of stack which are closely rectangular in cross section; and the provision of such stacking apparatus which is economical to manufacture and easy to use.

Generally, apparatus for stacking articles which is constructed according to the principles of the present invention comprises an article feeder constructed for receiving and transporting articles to be stacked. Support means is able to receive articles from the article feeder one at a time and one after another to form a stack on the support means, and to transport the stack of articles. The support means and the article feeder are capable of generally vertical motion relative to each other to permit articles to be stacked on top of each other as they are fed off of the article feeder and onto the support means. Stop means engages articles fed off of the article feeder to retain the articles on the support means. The stop means is mounted on the apparatus independently of the support means such that the stop means does not move with the support means as it transports the stack of articles.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
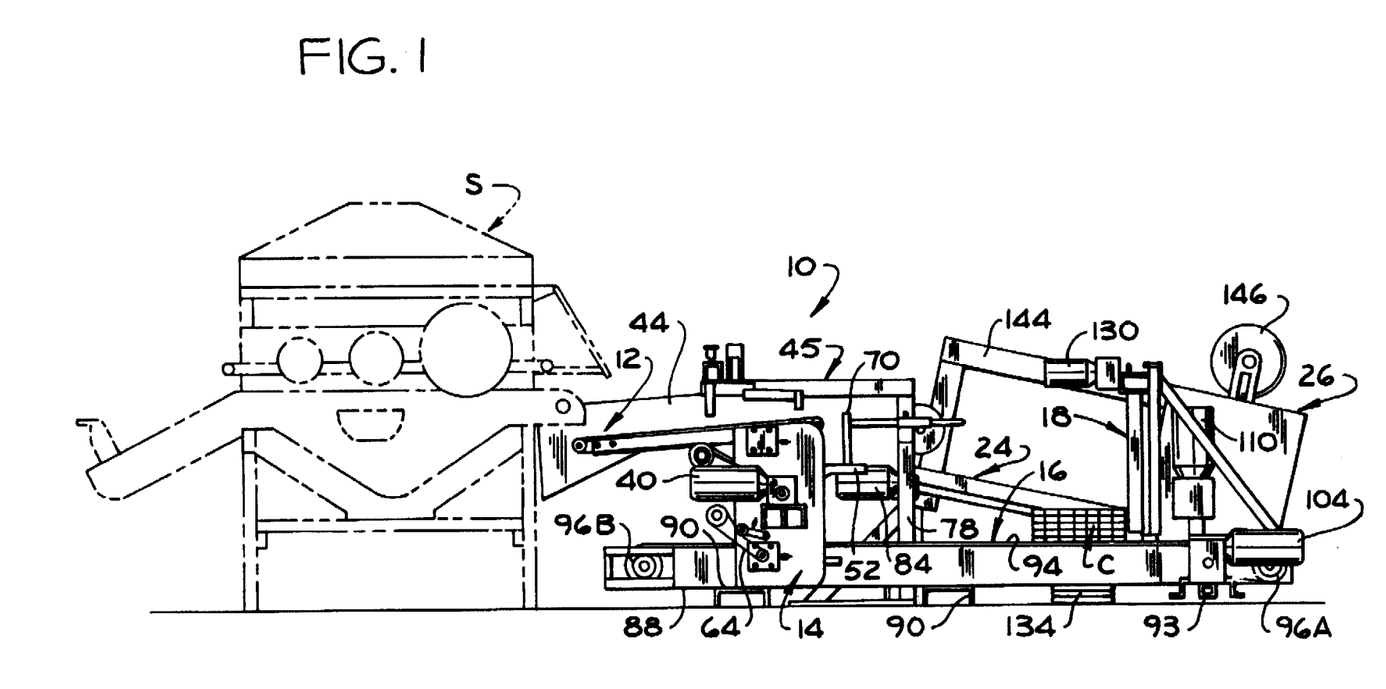
FIG. 1 is an elevational view of stacking apparatus showing in phantom an automatic saw positioned for feeding cut boards to the stacking apparatus.
Figure 2:
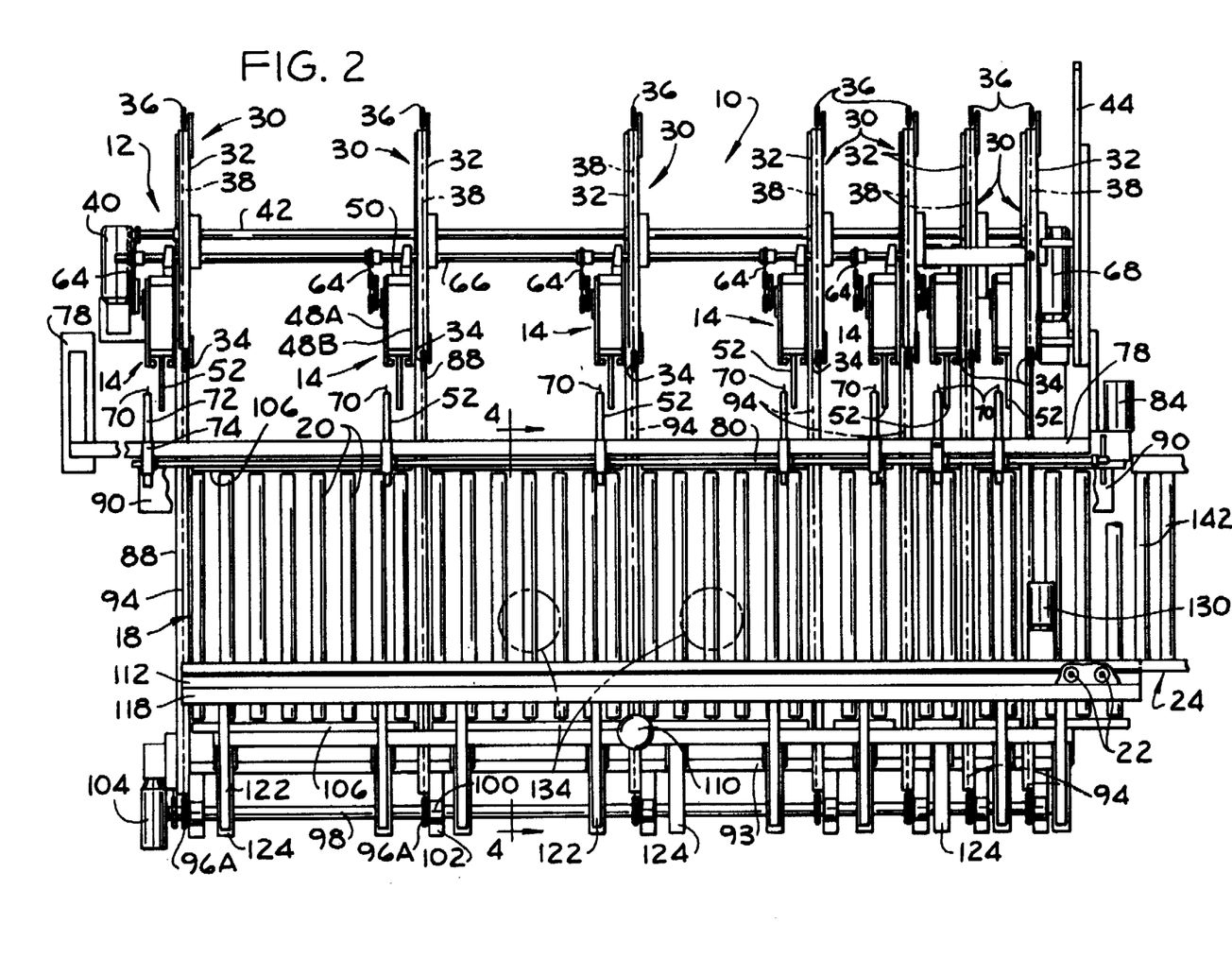
FIG. 2 is a top plan view of the stacking apparatus with an offload conveyor thereof broken away.

Referring now to the drawings, and in particular to FIGS. 1 and 2, stacking apparatus of the present invention (indicated generally at 10) is shown in conjunction with an automatic saw S which delivers cut boards to the apparatus for stacking. Stock boards (not shown) are fed manually into the left side (as seen in FIG. 1) of the saw S by a sawyer (not shown), and cut boards B (broadly, "articles") are discharged from the right side of the saw onto an article feeder, generally indicated at 12. An automated stock board feeding system (not shown) may be substituted for manual feed by the sawyer. The article feeder 12 transports the boards B one at a time and one after another to elevators, generally indicated at 14, on which consecutive boards B are stacked one on top of the other. The elevators 14 are capable of lowering the stacks onto a stack conveyor (indicated generally at 16) which conveys the stack of boards to a roller conveyor (indicated generally at 18) which includes horizontal rollers 20 and vertical rollers 22. In the preferred embodiment, the horizontal rollers 20 collectively constitute a "first member" of the roller conveyor 18, and the vertical rollers 22 collectively constitute a "second member" of the roller conveyor.

After several stacks of boards are conveyed to the roller conveyor 18, a collection of stacks C is formed, as shown in FIG. 1. The collection of stacks C is transported by the roller conveyor 18 to an offload conveyor indicated generally at 24. A strapping machine (designated generally by reference numeral 26) is capable of automatically strapping the collection of stacks C on the offload conveyor 24 to form a bundle ready for transporting to a truss assembly table (not shown) or other location. Although the stacking apparatus 10 of the present invention is described in a preferred embodiment as used in manufacture of roof trusses, it may be employed in other applications without departing from the scope of the present invention.

Figure 7:
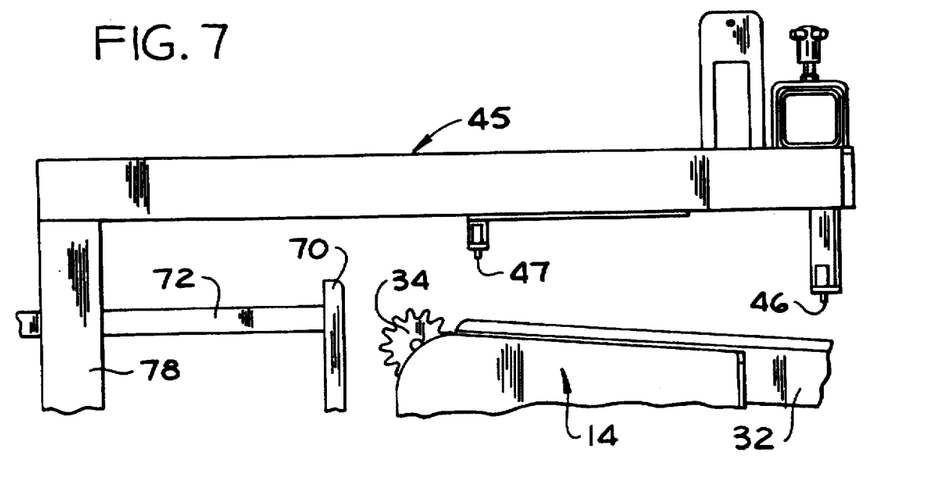
FIG. 7 is an enlarged fragmentary view of the apparatus showing sensors for detecting articles being fed for stacking.

As may be seen in FIG. 2, the article feeder 12 includes a plurality of chain conveyors, generally indicated at 30, comprising arms 32 mounted on respective elevators 14 and extending as cantilevers rearwardly from the elevators. Four chain conveyors 30 are provided in relatively closely spaced relation on the right side of the article feeder 12 for handling boards of shorter length. Three additional, substantially more spaced apart chain conveyors 30 are provided to the left of the four closely spaced chain conveyors for use in handling boards of longer length. Free ends of the arms 32 are disposed under a location on the automatic saw S where cut boards B are discharged. The arms 32 mount front and rear sprockets (designated 34 and 36, respectively) on which a chain 38 is mounted for rotation in a circuit to feed boards B from the saw S on an upper reach of the chain in a forward direction to the elevators 14. An electric chain conveyor motor 40 is connected to a feed conveyor drive shaft 42 extending the width of the article feeder 12 for driving the chains 38 synchronously to move the boards B to the elevators 14. Boards B are supported between two or more adjacent chain conveyors 30. A guide wall 44 at the right end of the article feeder 12 retains the boards B on the article feeder. Referring to FIG. 7, a bracket (designated generally by reference numeral 45) mounts a pair of photoelectric sensors (designated 46 and 47, respectively) above the article feeder 12 for detecting the presence of a board B passing underneath the sensors on the article feeder 12. The operation of the sensors 46, 47 in control of the stacking apparatus 10 will be described more fully hereinafter.

The elevators 14 each include a pair of side walls (designated 48A and 48B, respectively), a rear wall 50 and an open front. The arms 32 of each chain conveyor 30 are mounted on one side wall 48B of the elevator 14 and the chain 38 of each chain conveyor extends to a location just forward of the front edges of the side walls so that boards B delivered by the chain conveyors 30 are dropped off the front edges of the side walls of the elevators onto support fingers 52. As described more fully hereinafter, the support fingers 52 are indexed downwardly as each board B is added to the stack to maintain the top of the stack at a substantially constant location.

Figure 6:
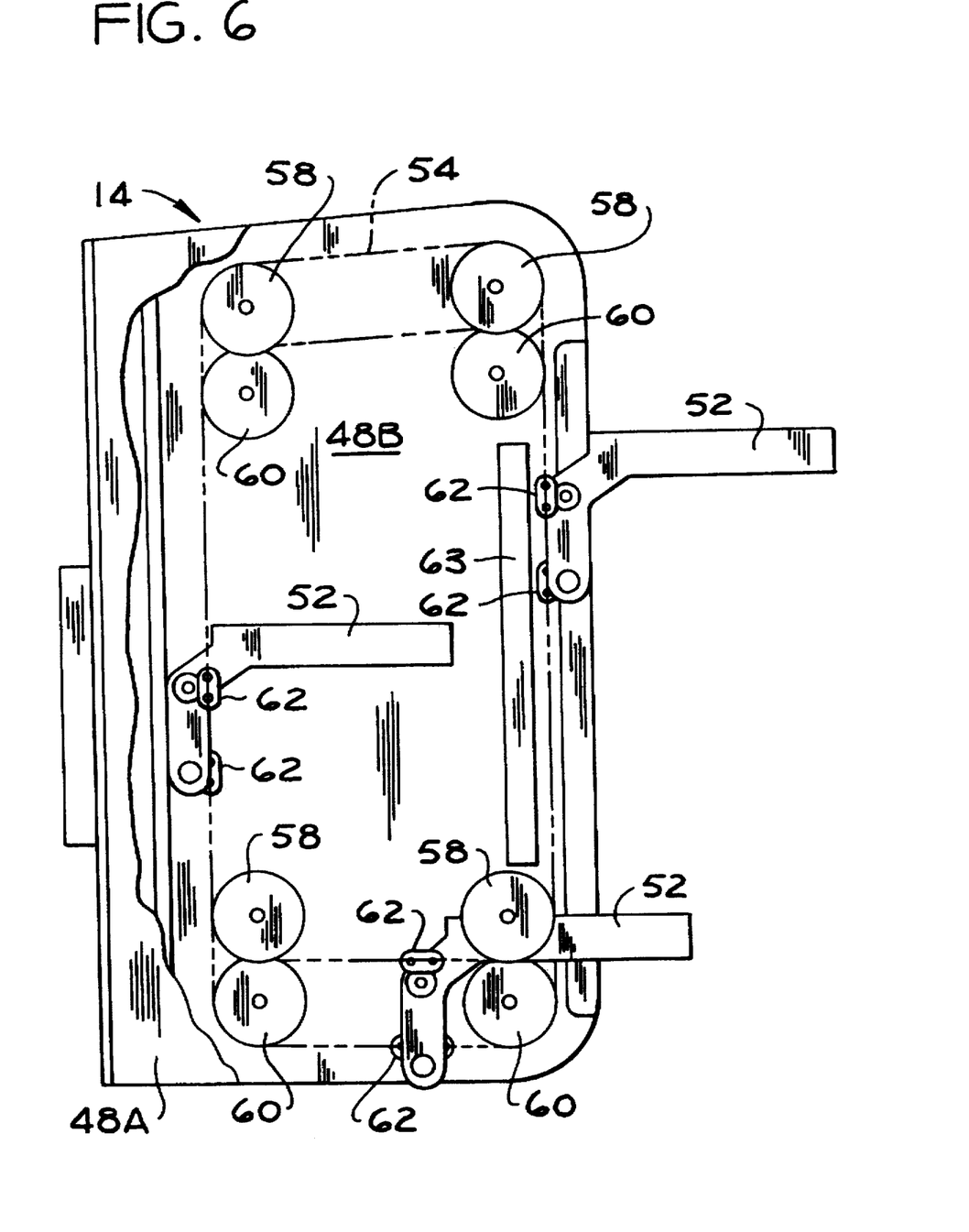
FIG. 6 is a schematic elevational view of an elevator of the stacking apparatus with parts broken away to show internal construction.

The construction and operation of all of the elevators 14 is substantially identical. Accordingly, a description of only one elevator 14 will be made. As shown schematically in FIG. 6, the elevator 14 has three support fingers 52 (broadly, "support means") mounted for motion in a circuit on two chains (designated 54 and 56, respectively) extending around respective sets of four sprockets mounted on opposite side walls 48A and 48B of the elevator. The four sprockets in each of the two sets of sprockets being designated 58 and 60, respectively. The sets of sprockets 58 and 60 and chains 58, 60 entrained thereon are vertically offset from one another so that as the fingers 52 travel around in a circuit, they always maintain a generally horizontal orientation. Thus as the finger 52 reaches the bottom of its circuit, it is withdrawn horizontally within the side walls 48A, 48B, travels up within the side walls, and then extends horizontally forward back out from between the side walls at the top of the circuit for receiving a new stack of boards B.

The fingers 52 are attached to the chains 54, 56 by connectors 62 which pivot to permit the fingers to remain in the horizontal position as they travel around the circuit. A backing plate 63 rigidly mounted on the elevator 14 engages the connectors 62 of the fingers 52 to support the fingers as they travel down the front of the elevator loaded with the weight of a stack of boards B. In this way, the fingers 52 are held from tipping forward under the load of the stack of boards. As shown in FIG. 2, the sprockets 58, 60 carrying the chains 54, 56 mounting the fingers 52 on all of the elevators 14 are connected by chains 64 to a single drive shaft 66 so that the movement of the fingers is synchronized among the several elevators. An electric elevator motor 68 is connected to the drive shaft 66 for driving rotation of the drive shaft and movement of the fingers 52 (FIG. 2).

Figure 5:
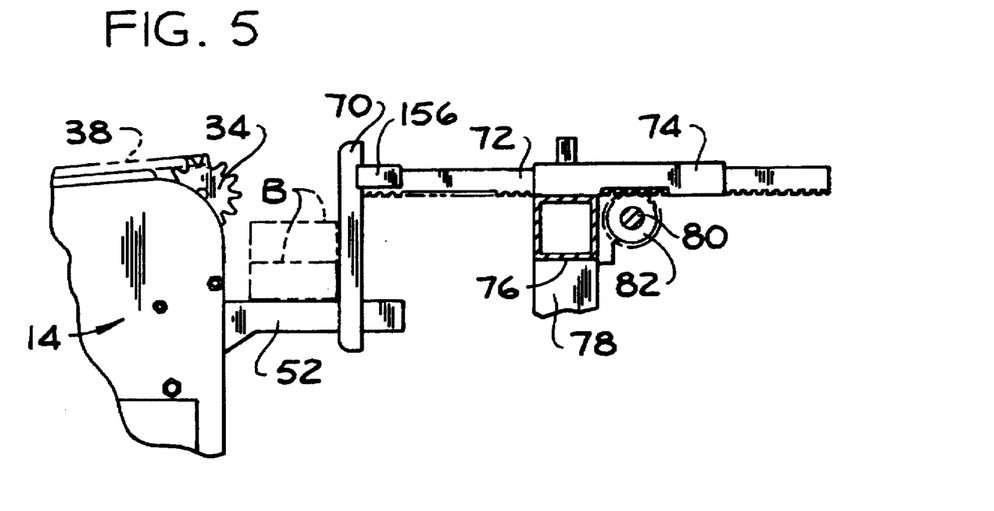
FIG. 5 is an enlarged, fragmentary elevational view showing an article feed chain, a stack supporting finger and a stop of the apparatus.

Referring to FIG. 5, a vertically elongate stop 70 next to each of the elevators 14 is positioned to engage a board B as it is dropped off the end of the chain conveyors 30 to guide the board onto the support finger 52 below. The stops 70 also serve as a vertical support to hold the boards B as a stack of boards is formed on the fingers 52. The stops 70 are each attached to a generally horizontal positioning rod 72 slidably mounted by a sleeve 74 on a beam 76. The beam 76 extends more than the full width of the article feeder 12 and is supported at its ends by stands 78 (FIG. 2). The stand 78 seen on the left side of FIG. 2 has been removed from FIG. 1 for clarity. The single beam 76 mounts all of the stops 70 independently of any connection to the article feeder 12, elevators 14 and other parts of the stacking apparatus 10. The stops 70 are used as vertical supports only in the initial formation of the stacks.

The beam 76 also mounts a shaft 80 which extends under the sleeves 74 forward of the beam. The shaft 80 includes a plurality of cogwheels 82, each in registration with an opening in the underside of a respective one of the sleeves 74 (FIG. 5). The positioning rod 72 is formed with teeth on its bottom, and the cogwheel 82 is enmeshed with the teeth of the positioning rod through the opening. Rotation of the shaft 80 by operation of a reversible electric motor 84 (FIG. 2) in a counterclockwise direction (as seen in FIG. 5) causes the positioning rod 72 to move the stop 70 closer to the elevator 14, while rotation in the opposite direction moves the stop farther away from the elevator. The motion of the stops is synchronized by the single shaft 80 driving their motion. In this way, the stacking apparatus 10 is readily adjusted for stacking boards of different sizes.

Once a stack of predetermined height is formed on the fingers 52, the fingers move vertically downward to deliver the stack to the stack conveyor 16 for conveying the stacks to a location remote from the article feeder 12. Referring again to FIGS. 1 and 2, the stack conveyor 16 is shown to comprise in the illustrated embodiment, one beam 88 for each of the elevators 14. The beams 88 each extend substantially the full length of the stacking apparatus 10 and supported on the floor by a pair of inverted channels 90, which run the full width of the article feeder 12 near the front end of the stacking apparatus 10. A tube 93 extending transversely of the stacking apparatus 10 ties together the beams 88 adjacent to the forward ends of the beams. Each beam 88 supports a drag chain 94 (broadly, "conveyor member") extending in a circuit between front and rear sprockets (designated 96A and 96B, respectively) located near the front and rear ends of the beam. The drag chains 94 collectively constitute "conveyor means" in the preferred embodiment. The drag chain 94 includes an upper reach capable of movement in a forward direction at the same time the article feeder 12 is feeding boards to form a stack. Thus, a second stack may be formed on a second set of the fingers 52 at the same time a first stack is being conveyed away from the article feeder 12 by the drag chains 94.

The upper reach of each drag chain 94 rides on and is supported by an upper face of the beam 88 so that the beam supports the weight of the stacks being conveyed by the drag chains. A lower reach of each drag chain 94 moves rearwardly to complete the circuit. The front sprockets 96A of each drag chain 94 are mounted for conjoint rotation on a shaft 98 attached to the apparatus 10 by bushings 100 connected to the forward ends of the beams 88 by angle irons 102. The shaft 98 is driven by a stack conveyor motor 104 and causes the drag chains 94 to move in a synchronized fashion along the beams 88. The beams 88 and drag chains 94 are offset from the elevators 14 so that the fingers 52 may move down below the beams 88 on one side thereof to deposit the stack of boards formed on the fingers onto the drag chains. The stack is supported between two or more adjacent drag chains 94. As may be seen in FIG. 2, the drag chains 94 are spaced closer together nearer to the right hand side of the stacking apparatus 10 for supporting stacks made up of shorter boards. The spacing of the drag chains 94 corresponds to that of the chain conveyors 30. The drag chains 94 have no vertical support members to hold the stacks as they are transported away from the article feeder 12. The stacks are transported freestanding on the drag chains 94.

Figure 4:
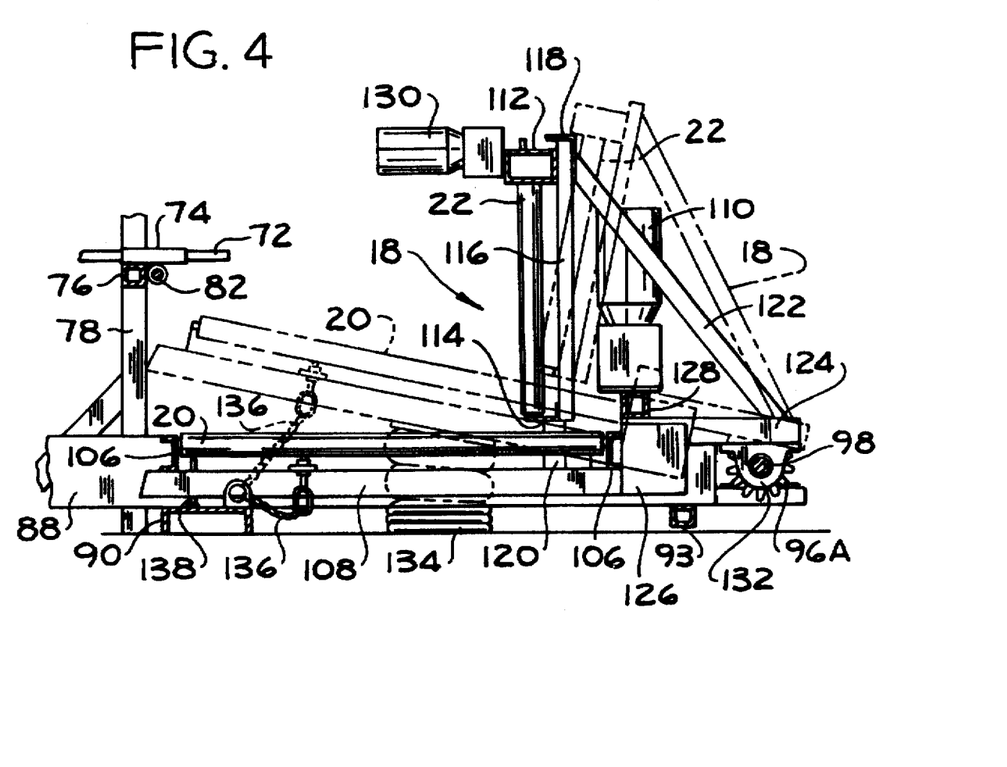
FIG. 4 is an enlarged fragmentary elevational view of the stacking apparatus showing a roller conveyor of the apparatus and illustrating a raised position of the conveyor in phantom.

The stacks are transported by the drag chains 94 to the roller conveyor 18 segmented into seven sections, six of which are disposed between adjacent drag chain beams 88 of the stack conveyor 16. The additional section is disposed to the right (as seen in FIG. 2) of the last drag chain beam 88 for conveying a collection of stacks laterally away from the stacking apparatus 10 to the offload conveyor 24. Each section is defined by an opposing, front and rear pair of bearing channels 106 in which respective ends of the horizontal rollers 20 are journalled (FIG. 4). The front and rear bearing channels 106 are fixedly attached as by welding to the front and rear ends, respectively, of one or two arms 108 extending under the horizontal rollers 20. The smaller sections having only two or three horizontal rollers 20 have only one arm 108, while the larger sections each have two arms on which the bearing channels 106 are mounted. An electric horizontal roller motor 110 is connected to the horizontal rollers 20 for conjointly driving their rotation to move the collection of stacks C laterally off of the stacking apparatus 10.

The vertical rollers 22 are all rotatably mounted between an upper box beam 112 and a lower angle iron 114 which extend the full width of the stacking apparatus 10. The box beam 112 and angle iron 114 are connected together by vertical members 116 attached to the box beam and angle iron at spaced apart locations along their lengths. The vertical members 116 are tied together by an elongate cap 118 attached to the tops of the vertical members 116 and extending the width of the stacking apparatus 10. The lower angle iron 114 is connected by struts 120 (only one is shown) to the arms 108 of the roller conveyor 18. The vertical members 116 are also supported by angled braces 122 which extend between the elongate cap 118 and pivot members 124 attached to the forward end of each arm 108 by pairs of plates 126 (only one is shown). A square tube 128 extending the width of the stacking apparatus 10 ties the pivot members 124 together. An electric vertical roller motor 130 is connected to the vertical rollers 22 for synchronously driving their rotation.

Bearings 132 (only one is shown) rigidly mounted on the undersides of each pivot member 124 at its front end receive the shaft 98 which synchronously drives the movement of the drag chains 94. As shown in phantom in FIG. 4, the roller conveyor 18 is capable of pivoting on the shaft 98 to a raised position. Pivoting is accomplished by the provision of two air bags 134 which can be selectively filled with air to expand and lift the arms 108 to pivot the roller conveyor 18 about the shaft 98. Tethers 136 (only one is shown) provided to control the final raised position of the roller conveyor 18 are anchored at one end to one of the inverted channels 90 and connected at the other end to a selected number of the arms 108 of the roller conveyor 18. Adjustable stands 138 connected to the rearward ends of the arms 108 are engageable with the inverted channel 90 to support the arms when in their lowered positions.

Figure 3:
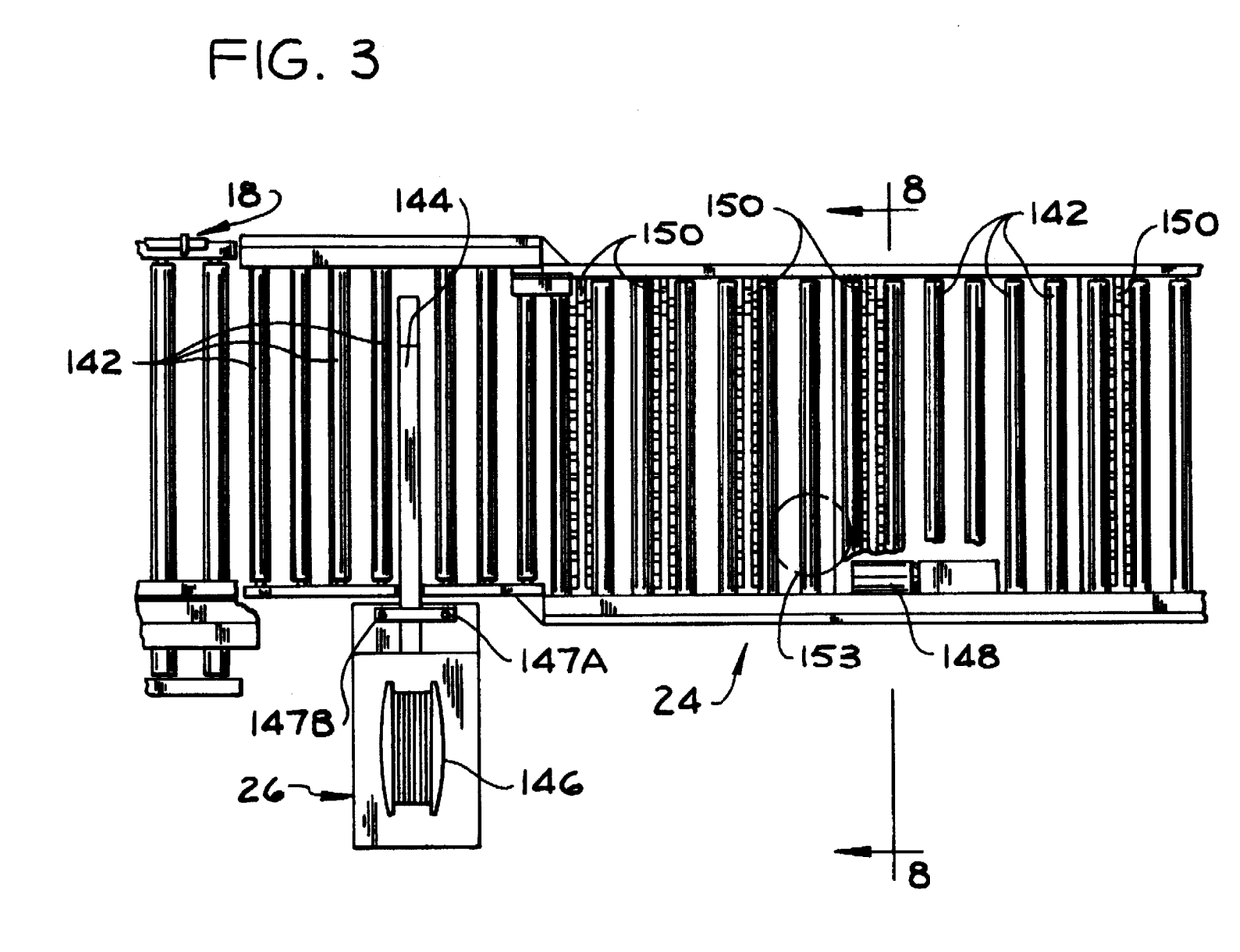
FIG. 3 is a fragmentary top plan view of the stacking apparatus showing only the offload conveyor.
Figure 8:
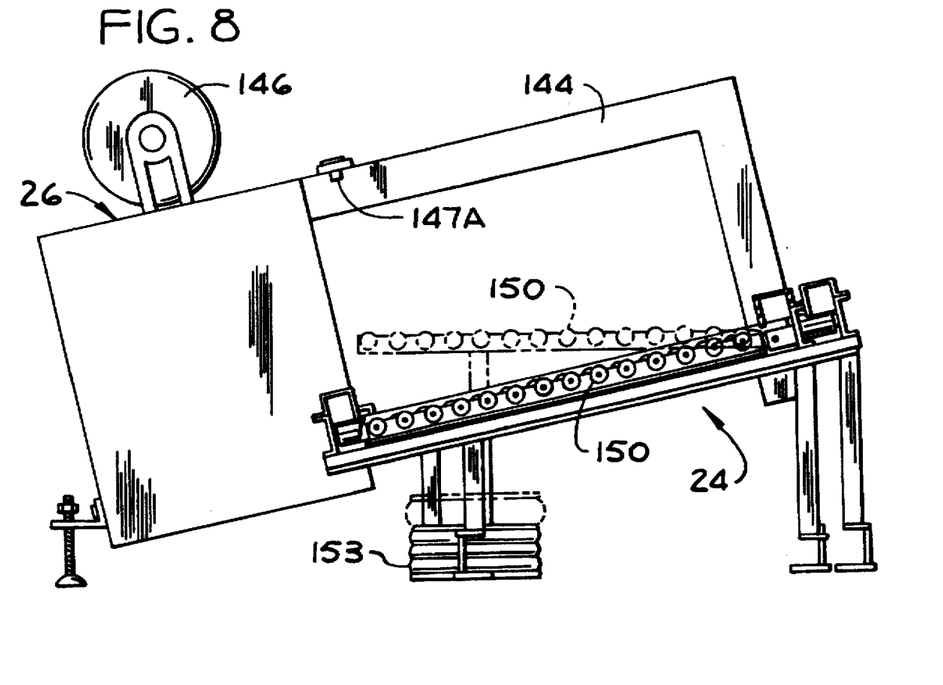
FIG. 8 is a cross section taken in the plane including line 8—8 of FIG. 3.

In the raised position, the horizontal rollers 20 of the roller conveyor 18 are in generally the same plane as rollers 142 of the offload conveyor 24. The electric motors 110, 130 may be energized to drive rotation of the horizontal and vertical rollers 20, 22 to move the collection of stacks C on the roller conveyor 18 laterally onto the offload conveyor 24. As shown in FIG. 3, a first section of the offload conveyor 24 incorporates a portion of the strapping machine 26 for automatically applying one or more straps around the collection of stacks C to form a secure bundle for transport to an assembly table. The strapping machine 26 places a strap around the collection of stacks C where the collection is positioned under an arm 144 of the strapping machine. A roll 146 on the top of the machine 26 holds strapping material. Sensors 147A, 147B (FIG. 8) mounted on the arm 144 of the strapping machine 26 detect when the collection of stacks C is positioned under the arm 144 for use in controlling activation of the strapping machine to place two or more straps around the collection of stacks. The strapping apparatus is Model No. T.P.S. 5000 manufactured by Thermolok Packaging Systems of Hopewell, Va. The rollers 142 of the offload conveyor 24 are also driven by an electric offload conveyor motor 148 to move the bundle. As shown in FIG. 8, ejectors 150 located between rollers 142 in the portion of the offload conveyor 24 downstream from the strapping machine 26 may be selectively raised by operation of another air bag 153 to slide the bundle forwardly off of the offload conveyor. The ejectors 150 are raised by filling the air bag 153 with air to vertically expand the bag.

Figure 9:
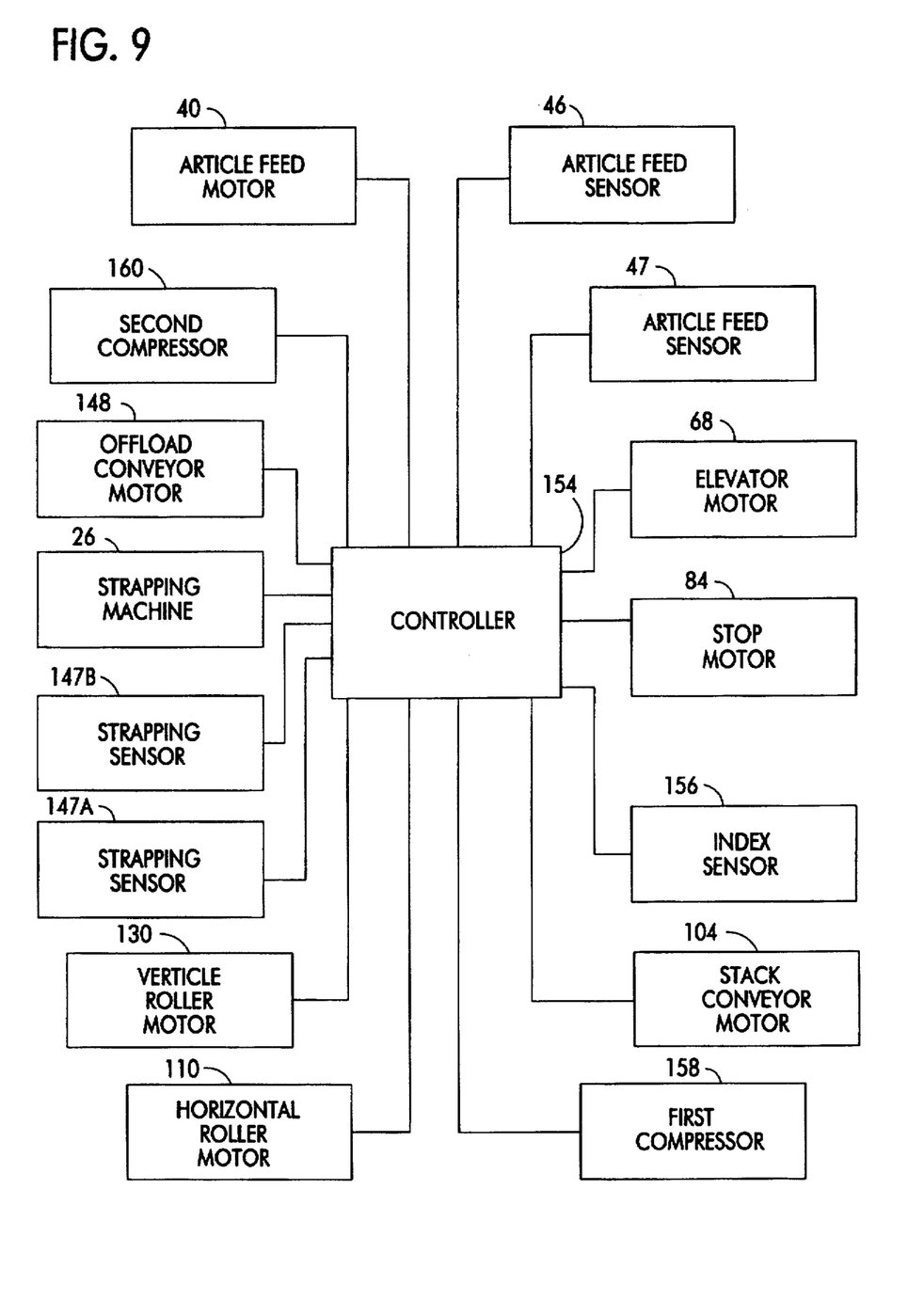
FIG. 9 is a block diagram of the controller and the components of the stacking apparatus controlled thereby.

As shown in FIG. 9, the stacking apparatus 10 is operated by a controller 154, such as a PLC. Modern truss manufacturing plants employ CAD programs to design trusses to be manufactured. The information in the program can be downloaded into the automatic saw S and into the stacking apparatus controller 154 for controlling the cutting and stacking of the components of the truss. The sawyer feeds stock boards into the automatic saw S which cuts the boards into truss components and discharges them onto two or more of the chain conveyors 30 of the article feeder 12. As the boards B are moved forwardly, they pass under the sensors 46, 47. The rearward sensor 46 is capable of detecting any jams in the machine. If the boards B become jammed they will line up on the article feeder under the sensor 46. If the sensor 46 sees a board for more than a predetermined period of time, it will shut off the machine and cause the controller 154 to signal that a jam has occurred. The sensor 47 counts each board as it passes underneath the sensor to so that the controller 154 can keep track of the number of boards in a given stack.

The controller 154 selectively energizes the stop adjustment motor 84 to position the stops 70 at a distance from the elevators 14 which will permit the boards B to fall down between the fronts of the elevators and the stops. Boards B are dropped one after another off of the front end of the article feeder 12 and onto two or more support fingers 52. The boards B engage the stops 70, which hold the boards from falling off the front edge of the fingers 52, and are stacked in a single column on the fingers. An index sensor 156 (e.g., a photoelectric eye) mounted in a fixed position sees each board as it is dropped onto the fingers 52. Each time the index sensor 156 sees a new board, the controller 154 activates the elevator motor 68 to index the fingers downwardly a fixed amount so as to keep the top of the stack at approximately the same position.

After a predetermined number of boards B (e.g., up to eight boards) have been stacked on the fingers 52, the controller 154 energizes the elevator motor 68 to move the fingers downwardly below the upper reaches of the drag chains 94 of the stack conveyor 16 to deposit the stack on two or more of the drag chains. A sensor (not shown) near the bottom of the elevator 14 is positioned to detect one of the fingers 52 at the bottom of the elevator and signals the controller 154 to establish a home position of the fingers and restart the cycle of operation of the elevators. At the same time the set of fingers 52 holding stack is moved down to deposit the stack on the stack conveyor 16, a second set of fingers is moved into position for receiving the boards to form a second stack. Once the stack moves below the stops 70, it is freestanding until such time as collection of stacks C is bundled together at the strapping machine 26. The absence of vertical supports to hold the stack up permits the stacking apparatus 10 to be of simpler construction and to operate substantially continuously.

The stack conveyor 16 transports the stack into engagement with the vertical rollers 22 of the roller conveyor 18, which hold the stack from further forward motion. The stack is positioned above the horizontal rollers 20 of the roller conveyor 18. In the preferred embodiment, the stack conveyor motor 104 runs continuously. However, the motor 104 may be stopped and started by the controller 154. The second stack formed is delivered by the stack conveyor 16 into engagement with the first stack, which holds the second stack from further forward movement with the drag chains 94. The controller 154 permits a predetermined number of stacks to be collected in this fashion, such as is shown in FIG. 1. The controller 154 is capable of selecting the number of boards in each stack so that the collection of stacks C formed is substantially rectangular in cross section. The controller 154 energizes a first compressor 158 to fill the air bags 134 under the roller conveyor 18 to tilt up the roller conveyor and lift the collection of stacks C off of the drag chains 94 on the horizontal rollers 20. The angle made by the horizontal rollers 20 in the raised position urges the collection of stacks C against the vertical rollers 22. The urging of the collected stacks against the vertical rollers 22 compacts the stacks in the collection tightly together, thereby increasing the stability of the collection of stacks C.

A sensor (not shown) detects the roller conveyor 18 is in its raised position and in response the controller 154 energizes the motors 110, 130 driving the horizontal and vertical rollers 20, 22 to move the collection of stacks C laterally off of the roller conveyor 18 and onto the offload conveyor 24. The controller 154 also activates the motor 148 to drive the rollers 142 of the offload conveyor 24, which are aligned with the horizontal rollers 20 in the raised position of the roller conveyor 18. The strap sensor 147A detects that the leading edge of the collection of stacks C has passed under the arm 144 of the strapping machine (FIG. 3). In response, the controller 154 deactivates the offload conveyor motor 148 to stop the collection of stacks C under the arm 144. The strapping machine 26 is activated to place a strap around the collection of stacks. The motor 148 is reactivated to move the collection of stacks C until the sensor 147B detects the end of the collection of stacks. The controller 154 then stops the motor 148 again and reactivates the strapping machine 26 to apply a second strap around the collection of stacks.

The offload conveyor 24 is activated by the controller 154 to move the bundle of stacks to a location where the bundle is unloaded from the offload conveyor. Several alternatives are permissible. The bundle may be transported by the rollers to the end of the offload conveyor 24. Alternatively, the ejectors 150 may be activated by the controller 154 to pop up from between adjacent rollers 142 to unload the bundle. More specifically, the controller 154 activates a second compressor 160 to fill the air bag 153 which lifts the ejectors 150. Wheels on the ejectors 150 permit the bundle to travel forwardly off of the offload conveyor 24. The bundle may then be transported to a truss assembly table for assembling the parts into a truss.

After the collection of stacks C has left the roller conveyor 18, the controller 154 deactivates the first compressor 158 and exhausts air from the bags 134. The roller conveyor 18 is returned to its lowered position (shown in solid lines in FIG. 4). A sensor (not shown) detects the return of the roller conveyor 18 to its lowered position, signals the controller 154 that additional stacks of boards may be received, and restarts the stack collecting cycle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for stacking articles comprising:
   an article feeder constructed for receiving and transporting articles to be stacked;
   support means for receiving articles from the article feeder one at a time and one after another to form a stack on said support means and for transporting the stack of articles, said support means and the article feeder being capable of generally vertical motion relative to each other to permit articles to be stacked on top of each other as they are fed off of the article feeder and onto said support means;
   stop means for engaging articles fed off of the article feeder to retain the articles on said support means, said stop means being mounted on the apparatus independently of said support means such that said stop means does not move with said support means as it transports the stack of articles;

a stack conveyor located below the article feeder and constructed for conveying stacks formed on said support means to a location remote from the article feeder and said support means, said support means being capable of movement below the stack conveyor for depositing stacks of articles formed on said support means on the stack conveyor, and means for receiving stacks from the stack conveyor for forming a collection of stacks, said receiving means including a first member and a second member, said receiving means being capable of tilting to raise the first member for lifting the collection of stacks and urging the stacks against the second member thereby to tighten the engagement of the stacks with each other in the collection.

2. Apparatus as set forth in claim 1 further comprising means for automatically binding together the collection of stacks.

3. Apparatus for stacking articles comprising:

an article feeder constructed for receiving and transporting articles to be stacked;

support means for receiving articles from the article feeder one at a time and one after another to form a stack on said support means and for transporting the stack of articles, said support means and the article feeder being capable of generally vertical motion relative to each other to permit articles to be stacked on top of each other as they are fed off of the article feeder and onto said support means;

stop means for engaging articles fed off of the article feeder to retain the articles on said support means, said stop means being mounted on the apparatus independently of said support means such that said stop means does not move with said support means as it transports the stack of articles;

said support means comprising an elevator associated with each of the fingers, each elevator mounting one of the fingers for generally linear movement horizontally outwardly from a position retracted within the elevator to a position extended from the elevator in which the finger is disposed for receiving articles to be stacked thereon, for movement generally vertically downwardly in the extended position for forming the stack and transporting the stack to the stack conveyor, and for generally linear movement horizontally from the extended position back to the retracted position within the elevator.

4. Apparatus as set forth in claim 3 wherein the elevator mounts the finger for movement around a circuit, the finger maintaining substantially horizontal orientation as it travels around the circuit.

5. Article stacking apparatus for stacking elongate articles having a length and a width, the apparatus comprising:

a article feeder constructed for receiving and transporting the elongate articles to be stacked;

support means for receiving the elongate articles from the article feeder one at a time and one after another to form a stack on said support means and for transporting the stack of articles, said support means and the article feeder being capable of generally vertical motion relative to each other to permit articles to be stacked on top of each other as they are fed off of the article feeder and onto said support means;

spaced apart stops for engaging articles fed off of the article feeder along the lengths of the articles to retain the articles on said support means, the stops being mounted on the apparatus independently of said support means such that the stops do not move with said support means as it transports the stack of articles, each stop being positioned a distance greater than the width of each article from the article feeder, but less than a distance twice the width of each article from the feeder such that the stops permit formation of only a single stack of articles on said support means at a time.

6. Apparatus as set forth in claim 5 wherein said stop means comprises at least two stands, a beam supported between the stands and extending generally across the stacking apparatus, and at least one stop mounted on the beam.

7. Apparatus as set forth in claim 5 further comprising a stack conveyor located below the article feeder and constructed for conveying stacks formed on said support means to a location remote from the article feeder and said support means, said support means being capable of movement below the stack conveyor for depositing stacks of articles formed on said support means on the stack conveyor.

8. Apparatus as set forth in claim 7 wherein the stack conveyor is free of vertical supports to engage the stack of articles deposited thereon.

9. Apparatus as set forth in claim 7 wherein the stack conveyor comprises means for conveying a stack of articles, said conveying means extending in a circuit and having an upper reach movable in a forward direction for holding the stack of articles and a lower reach movable in a generally rearward direction.

10. Apparatus as set forth in claim 9 further comprising a controller operable to cause the upper reach of said conveying means to move in said forward direction at the same time the article feeder is feeding articles to said support means whereby the apparatus may form a second stack of articles at the same time a first stack of articles is being conveyed by the stack conveyor to a location remote from the article feeder.

11. Apparatus as set forth in claim 5 wherein the steps are adjustable in a generally horizontal direction for use in stacking articles of different sizes.

12. Apparatus as set forth in claim 11 further comprising a controller for controlling an adjustment of the steps according to the size of article to be stacked.

13. Apparatus as set forth in claim 12 wherein said support means comprises a plurality of fingers located at spaced apart locations, each finger being located generally adjacent to one of the stops.

14. Apparatus as set forth in claim 5 wherein said support means comprises a plurality of spaced apart support fingers adapted for supporting the stack of articles between the fingers.

15. Apparatus as set forth in claim 14 further comprising a stack conveyor located below the article feeder and constructed for conveying stacks formed on the fingers to a location remote from the article feeder and the fingers, the fingers and stack conveyor being constructed to permit the fingers to move below the stack conveyor for depositing stacks of articles formed on said support means on the stack conveyor.

16. Apparatus as set forth in claim 14 wherein said support means further comprises an elevator associated with each of the fingers, each elevator mounting one of the fingers for movement generally horizontally outwardly from a position retracted within the elevator to a position extended from the elevator in which the finger is disposed for receiving articles to be stacked thereon, for movement generally vertically downwardly in the extended position for forming the stack and transporting the stack to the stack conveyor, and for movement generally horizontally from the extended position back to the retracted position within the elevator.

17. Apparatus as set forth in claim 15 wherein the stack conveyor comprises a plurality of spaced apart conveyor members, each of said conveyor members extending in a circuit and having an upper reach movable in a forward direction for holding the stack of articles and a lower reach movable in a generally rearward direction, the conveyor members being offset from the fingers whereby the fingers are movable below the upper reaches of the conveyor members for depositing the stack of articles on at least two of the conveyor members.

* * * * *